May 11, 1926.

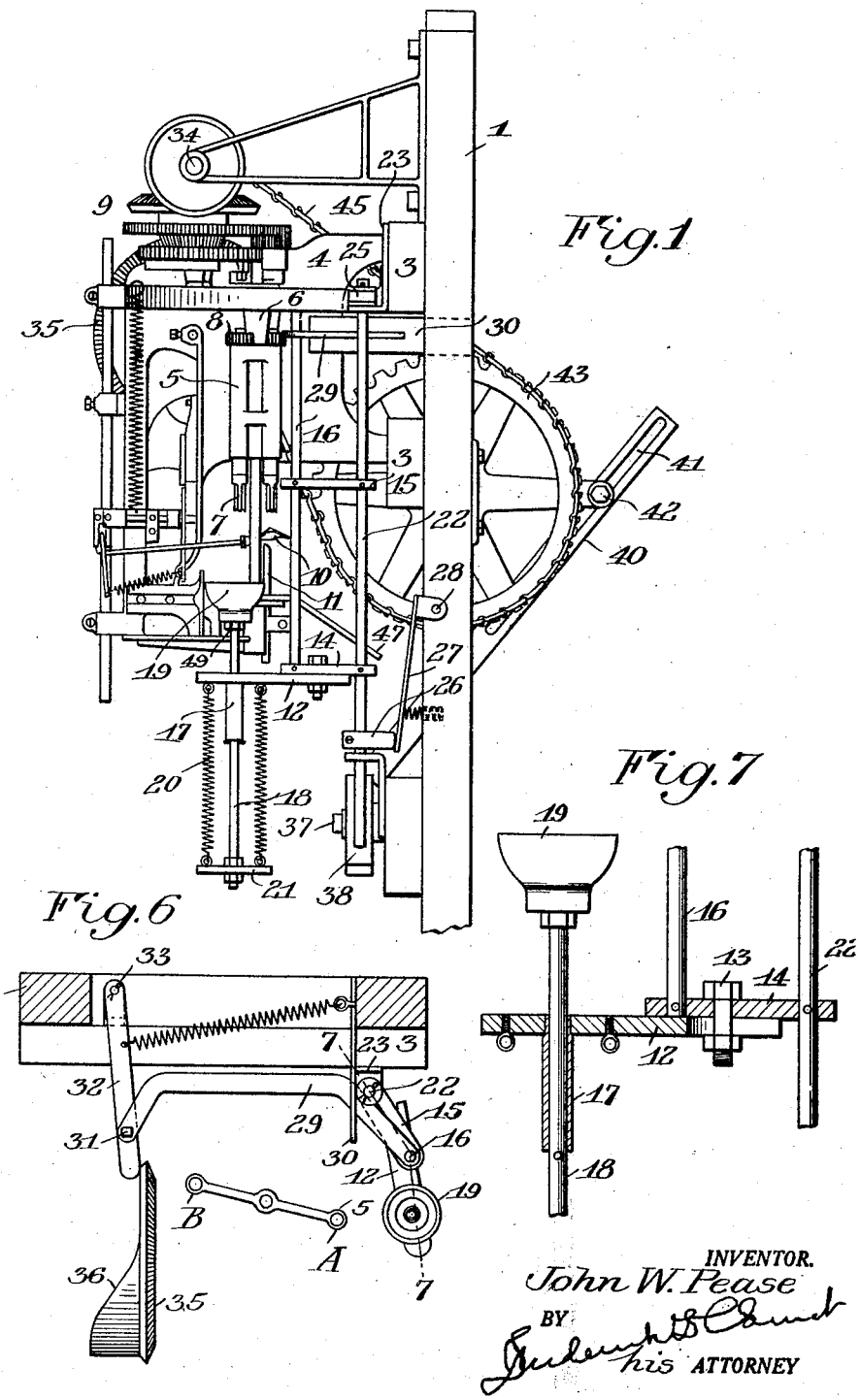

J. W. PEASE

APPLE PARING MACHINE

Filed June 13, 1924

INVENTOR.
John W. Pease
BY
his ATTORNEY

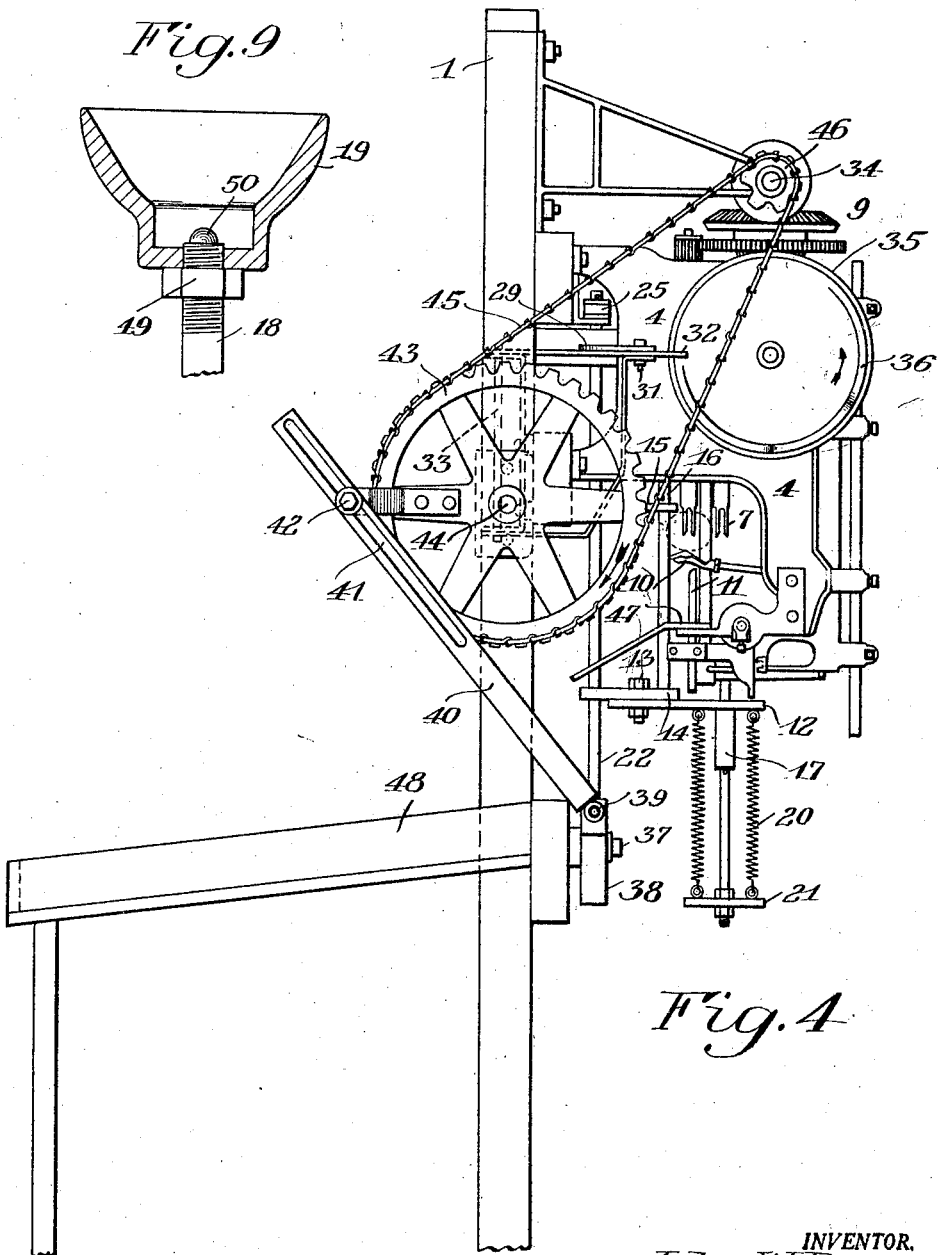

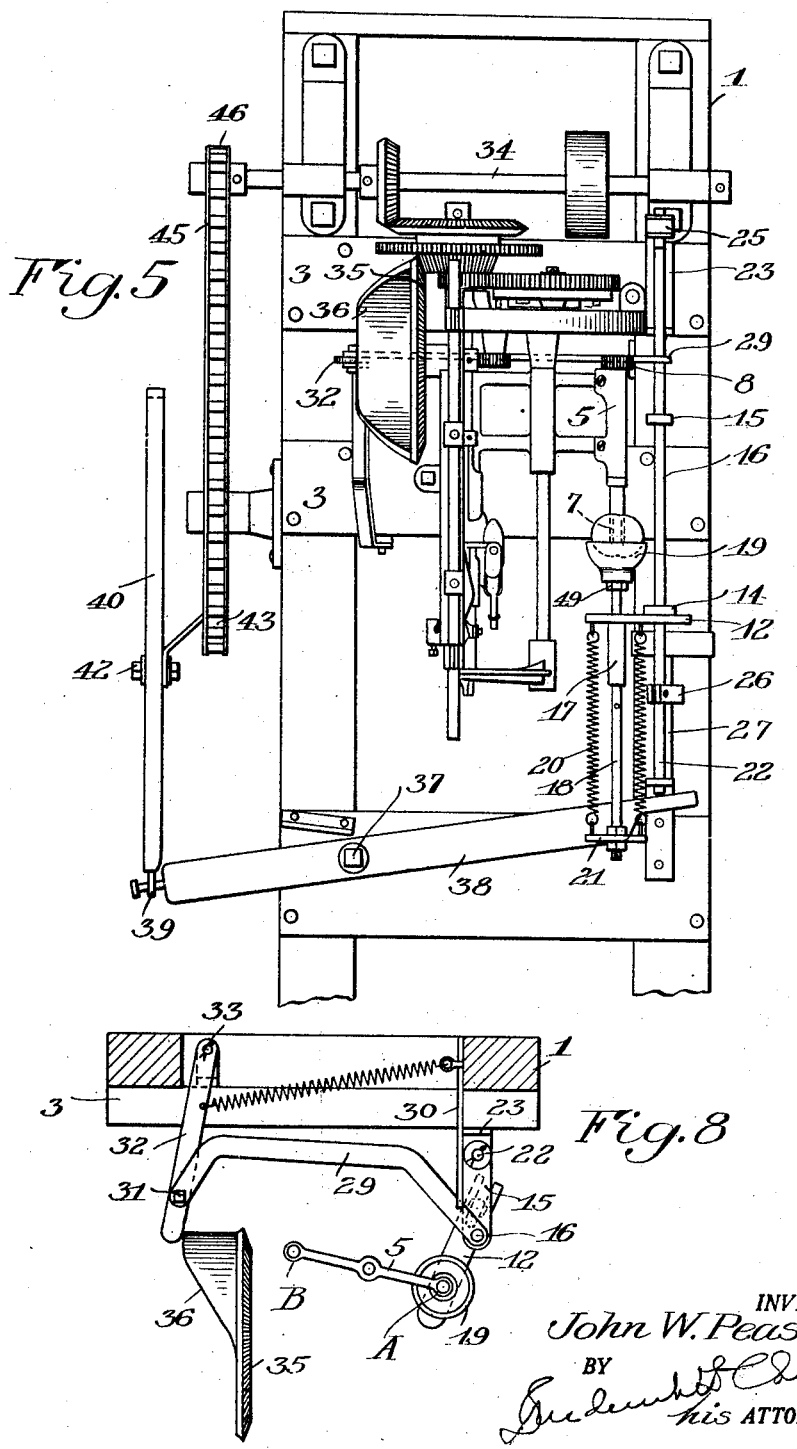

Patented May 11, 1926.

1,584,398

UNITED STATES PATENT OFFICE.

JOHN W. PEASE, OF ROCHESTER, NEW YORK.

APPLE-PARING MACHINE.

Application filed June 13, 1924. Serial No. 719,905.

My present invention relates to paring machines of the type used in paring apples and similar fruit and it has for its object to provide a simple and conveniently operable machine of this character provided with improved means for feeding the fruit to the paring mechanism whereby an operator may accurately feed a plurality of machines without danger to him or herself and in a manner that insures a proper centering of the fruit on the parer and a complete paring and coring thereof. A further object of the invention is to provide the improved means for discharging and disposing of pared fruit as well as the cores and peelings. To these and other ends the invention resides in certain improvements and combinations of parts all as will be hereinafter more fully described, the novel features being pointed out in the claims at the end of the specification.

In the drawings:

Figure 1 is a front view of a paring machine and feeding mechanism therefor constructed in accordance with and illustrating one embodiment of my invention;

Figure 4 is a rear view;

Figure 5 is an enlarged fragmentary side view similar to Figure 2 but with the parts in a different position;

Figure 6 is an enlarged fragmentary plan view of the actuating mechanism for the fruit feeding holder;

Figure 7 is an enlarged section on the line 7—7 of Figure 6 showing the mounting of the fruit holder and Figure 8 is a view similar to Figure 6 with the parts in another position.

Figure 9 is an enlarged detail section of the cup.

Similar reference numerals throughout the several views indicate the same parts.

Figure 3:
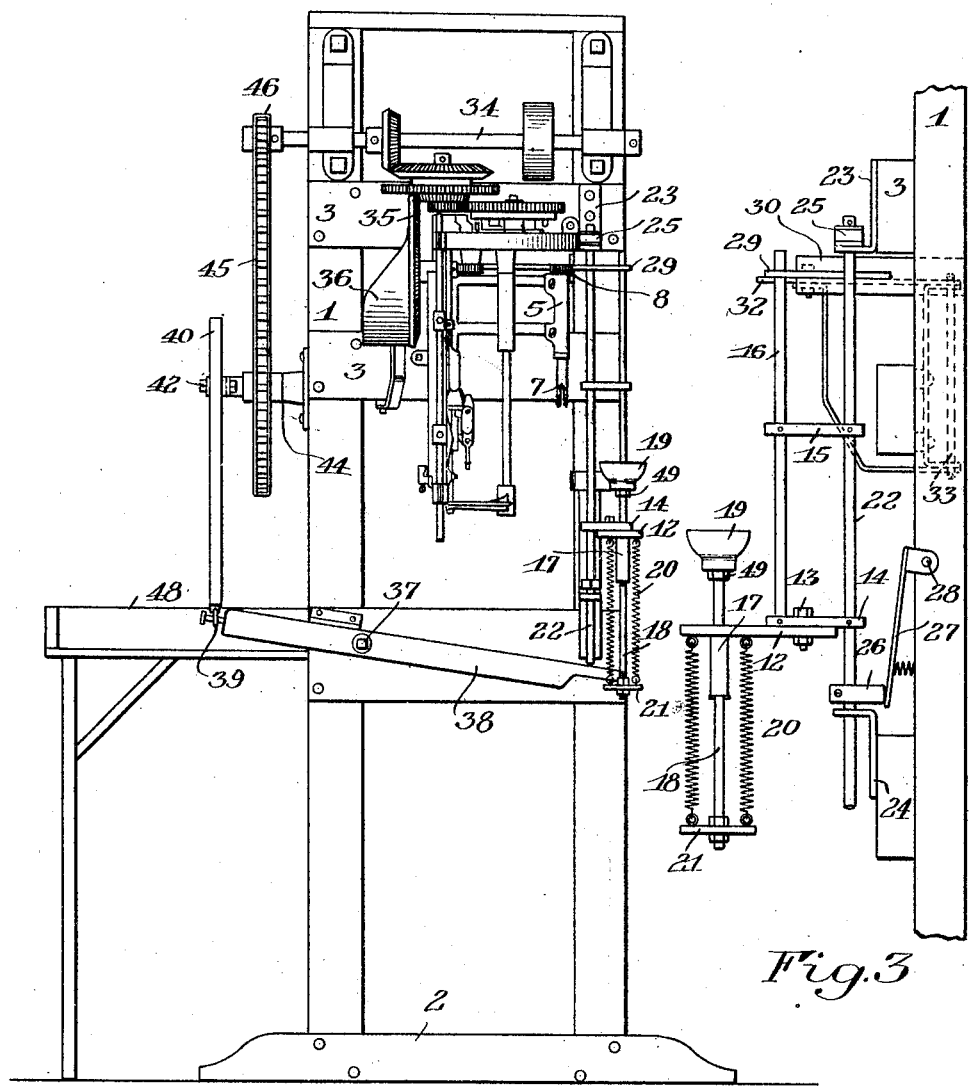
Figure 3 is an enlarged view of the feeder taken from the front.

To first give a general idea of the construction and mode of operation of my parer and feeder, the fork spindles are arranged to both rotate and revolve on vertical axes instead of horizontally as usual. The feeder embodies a fruit holder movable horizontally from a fruit receiving position to an impaling position in alignment with a fork after which it moves vertically to impale the fruit on the latter. A device acting in conjunction with the corer and stripper deflects the pared fruit into a suitable laterally arranged receptacle while the parings drop down directly beneath the machine. Inasmuch as the corer and its carriage operate vertically their weight is compensated for by a suitable spring.

Referring more particularly to the drawings, it is not thought necessary to describe the paring machine itself in other than a general way inasmuch as it is of a familiar type well known on the present market. A vertical frame 1 provided with a base 2 is provided with cross pieces or bolsters 3 to which are secured the feet of the parer frame 4. The fork reel 5 adapted to revolve about a vertical axis in a bearing 6 carries a plurality of rotary forks 7 driven by pinions 8 through suitable gearing indicated generally at 9 which gearing causes the reel to revolve intermittently and cause the forks to be alternately stopped at the impaling point indicated at A in Figures 6 and 8. From there they revolve to the paring position indicated at B in the same figures where they are aligned with the knife 10 and corer 11 operating as usual.

The feeding device embodies a horizontally swinging arm 12 located at the front of the machine and secured by a bolt 13 to the lower cross piece 14 of a guide frame consisting further of a cross piece 15 and vertical guide rods 16 and 22. This bolt permits the arm 12 to be adjusted to occupy any desired normal angular position for reasons that will later appear. Guided in a collar 17 at the outer end of the arm 12 is the stem 18 of a fruit holding and feeding cup 19. The cup is resiliently supported by two extensible springs 20 having their upper ends attached to the arm 12 and their lower ends secured to a head 21 fastened to the lower end of the stem 18.

The guide rod 22 of the feeder frame is adapted to reciprocate vertically in upper and lower brackets 23 and 24 on the main frame and is provided at its upper end with a suitable buffer head 25 to limit its downward motion and define its normal position. Near the lower end it carries a dog 26 adapted, when the frame is lowered, to slide against an inclined spring pressed plate 27 secured to the frame at 28 and having a pivotal movement to reduce the shock of lowering the frame. The other guide rod 16 of the frame is adapted to slide similarly in an actuating link 29 that moves in a horizontal plane (Figure 6) and which operates to swing the feeder frame carrying the cup 19 with it in a definite arc about the rod 22 as a center which last mentioned rod thereby acts as a rock shaft. This link 29 is supported in a guide consisting of a slotted plate 30 extending out from the main frame 1. Its other end is pivoted at 31 to a swinging bracket 32 pivoted at 33 in the frame 1 so that oscillations of this bracket swing the feed frame correspondingly.

The gearing 9 of the parer which is driven from the pulley shaft 34 includes the vertical bevel gear 35 which has a crown cam 36 thereon that engages the bracket 32 in timed relation to the cycle of the parer to swing the feed frame at the proper time. The frame is normally in the position of Figure 2 so that the cup 19 is at a forward point on the machine. The operator stands at the front and places the apples one by one in the cup. The cup then swings rearwardly into alignment with the parer fork 7, that is, in the impaling position A and a properly timed actuator about to be described then thrusts it upwardly through its stem 18 impaling the apple on the fork. It immediately lowers to permit the fork reel 5 to revolve and carry the apple to paring position at the rear while the feeder frame moves forwardly again to its original fruit receiving position.

Figure 2:
Figure 2 is a side view.

The actuating mechanism for moving the cup vertically is best shown in Figures 2 and 4. Pivoted to the frame 1 at 37 is a lever 38 the forward end of which engages beneath the lower end of the guide rod 22 of the feeder frame. At its rear end it is connected by a universal joint 39 to a slotted pitman 40 the slotted portion 41 of which rides on a wrist pin 42 on a sprocket wheel 43. The sprocket is mounted on a shaft 44 and is driven by a chain 45 from a spur 46 on the pulley shaft 34 so that it operates in timed relation to the paring mechanism. When the wrist pin 42 strikes the lower end of the slot 41 the lever 38 is rocked and the feeder frame raised. The latter returns through its own weight.

The springs 20 support the cup 19 at a normally correct elevation and when the feeder frame is raised to apply the apple to the fork the cup thrusts it thereon with a yielding pressure that compensates for different sizes and densities of fruit and prevents, in any event, a harsh contact between the cup and fork.

When the corer 11 after coring the fruit is retracted with a joint rectilinear and swinging movement in the usual manner, it brings the apple down against a forked doffer plate 47 that unseats it from the corer. This doffer is inclined and directs the apple laterally to a tray 48 or any other receptacle or makes other disposition thereof as required. The vertical position of the paring machine in general aids in this convenient arrangement for disposing of the peeled fruit.

I prefer to use the form of cup or fruit holder shown in detail in Figure 9. It is threaded on the upper end of the stem 18 against an adjustable nut 49, the position of which regulates the extent to which a small protuberance 50 projects into the cup to engage the bloom end of an apple and center it.

I claim as my invention:

1. In a paring machine, the combination with a rotary fork mounted on a vertical axis and a corer movable vertically toward and from the same, of a doffer cooperating with the corer and having an inclined portion adapted to deflect a pared fruit so that it will fall laterally.

2. In a paring machine, the combination with a rotary downwardly projecting fork and a knife cooperating therewith, of a feeding device embodying a fruit holder adapted to move in a relatively transverse plane into and out of alignment with the fork and to provide a firm support for the fruit on the side of the holder opposite to the fork.

3. In a paring machine, the combination with a rotary fork and a knife cooperating therewith, of a feeding device embodying a fruit holder adapted to swing in a relatively transverse plane into and out of alignment with the fork and means for operating it rectilinearly toward and from the fork.

4. In a paring machine, the combination with a rotary fork mounted on a vertical axis and a knife cooperating therewith, of a feeding device embodying a fruit holder adapted to swing horizontally into and out of alignment with the fork and means for operating it rectilinearly toward and from the fork in timed relation to the operations of the fork and knife.

5. In a paring machine, the combination with a rotary fork and a knife cooperating therewith, of a feeding device embodying a fruit holder adapted to swing in a relatively transverse plane into and out of alignment with the fork, means for operating it rectilinearly toward and from the fork and a yielding support for the fruit holder adapted to yield in the last mentioned direction.

6. In a paring machine, the combination with a main frame and paring mechanism secured thereto embodying a rotary downwardly projecting fork turning on a vertical axis and a knife cooperating therewith, of a horizontally swinging frame on the main frame carrying a fruit holding cup adapted to move into and out of alignment with the fork beneath the same and to support the fruit on its under side.

7. In a paring machine, the combination with a main frame and paring mechanism secured thereto embodying a rotary fork turning on a vertical axis and a knife cooperating therewith, of a horizontally swinging feeder frame on the main frame carrying a fruit holding cup adapted to move into and out of alignment with the fork, guides on the main frame in which the feeder frame is also vertically movable and means for raising the feeder frame when the cup is in alignment with the fork.

8. In a paring machine, the combination with a main frame and paring mechanism secured thereto embodying a rotary fork turning on a vertical axis and a knife cooperating therewith, of a horizontally swinging feeder frame on the main frame carrying a fruit holding cup adapted to move into and out of alignment with the fork, guides on the main frame in which the feeder frame is also vertically movable, a wheel on the main frame turning with the paring mechanism, a pitman on the wheel and a lever actuated by the pitman and cooperating with the feeder frame to raise it when the cup is in alignment with the fork.

9. In a paring machine, the combination with a main frame and a paring mechanism secured thereto embodying a rotary fork turning on a vertical axis, a knife cooperating therewith and driving gearing including a cam wheel, of a horizontally swinging feeder frame on the main frame carrying a fruit holding cup adapted to move into and out of alignment with the fork and means for swinging the feeder frame in timed relation to the parer embodying a swinging member on the main frame actuated by the cam wheel and a link connecting it with the feeder frame.

JOHN W. PEASE.